US012614983B2

(12) United States Patent
Lin et al.

(10) Patent No.: US 12,614,983 B2
(45) Date of Patent: Apr. 28, 2026

(54) POWER CONVERTER AND POWER CONVERSION METHOD CAPABLE OF BALANCING ENERGY AND HYBRID POWER SUPPLY

(71) Applicant: DELTA ELECTRONICS, INC., Taoyuan City (TW)

(72) Inventors: Hung-Chieh Lin, Taoyuan City (TW); Yi-Ping Hsieh, Taoyuan City (TW); Hsin-Chih Chen, Taoyuan City (TW); Hung-Yu Huang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 212 days.

(21) Appl. No.: 18/470,950

(22) Filed: Sep. 20, 2023

(65) Prior Publication Data

US 2025/0047201 A1 Feb. 6, 2025

(30) Foreign Application Priority Data

Aug. 1, 2023 (CN) .......................... 202310954928.2

(51) Int. Cl.
*H02M 3/158* (2006.01)
*H02M 1/00* (2006.01)
*H02M 5/293* (2006.01)

(52) U.S. Cl.
CPC ......... *H02M 3/158* (2013.01); *H02M 1/0003* (2021.05); *H02M 1/0083* (2021.05); *H02M 5/2932* (2021.05)

(58) Field of Classification Search
CPC .... H02M 1/083; H02M 1/0085; H02M 1/009; H02M 1/095; H02M 1/0003;
(Continued)

(56) References Cited

U.S. PATENT DOCUMENTS 10,128,756 B2 11/2018 Zhang et al.
2002/0093315 A1* 7/2002 Sluijs ..................... H02M 3/158
323/267
(Continued)

FOREIGN PATENT DOCUMENTS

CN 102244477 A 11/2011
CN 106451576 A 2/2017
(Continued)

OTHER PUBLICATIONS

Search Report dated Mar. 4, 2024 of the corresponding European patent application No. 23198564.9.
(Continued)

*Primary Examiner* — Nguyen Tran
(74) *Attorney, Agent, or Firm* — Muncy, Geissler, Olds and Lowe P.C.

(57) ABSTRACT

A power converter is coupled between a power source and multiple loads, and the power converter includes a first switch module. The switch module includes an inductor, a first switch, a second switch, a third switch, and a fourth switch. The first switch, the second switch, the third switch, and the fourth switch are configured to be turned on or turned off so that the inductor is stored energy or released energy to converter the power source into multiple voltages to the multiple loads.

13 Claims, 13 Drawing Sheets

10

(58) Field of Classification Search
CPC ............. H02M 1/0006; H02M 1/0009; H02M 5/2932; H02M 5/2835; H02M 5/2937; H02M 5/257; H02M 3/158; H02M 3/156; H02M 3/155; H02M 3/157; H02M 3/1582; H02M 3/1586; H02M 3/1588
See application file for complete search history.

(56) References Cited

U.S. PATENT DOCUMENTS

| | | | |
|---|---|---|---|
| 2013/0009618 A1* | 1/2013 | Su | H02M 3/158 323/271 |
| 2013/0234513 A1 | 9/2013 | Bayer | |
| 2022/0294346 A1 | 9/2022 | Boeke | |
| 2022/0321005 A1 | 10/2022 | Chen et al. | |

FOREIGN PATENT DOCUMENTS

| | | |
|---|---|---|
| CN | 104167918 B | 6/2017 |
| CN | 112600423 A | 4/2021 |
| CN | 114270684 A | 4/2022 |
| CN | 113114040 B | 6/2022 |
| CN | 113364294 B | 7/2022 |
| CN | 115589146 A | 1/2023 |
| EP | 4071990 A1 | 10/2022 |
| JP | 2005124248 A | 5/2005 |
| TW | 202002450 A | 1/2020 |
| WO | 2013157699 A1 | 10/2013 |

OTHER PUBLICATIONS

Office Action dated May 27, 2025 of the corresponding Japan patent application No. 2024-106701.
Search Report dated Dec. 17, 2023 of the corresponding PCT patent application No. PCT/CN2023/110470.

* cited by examiner

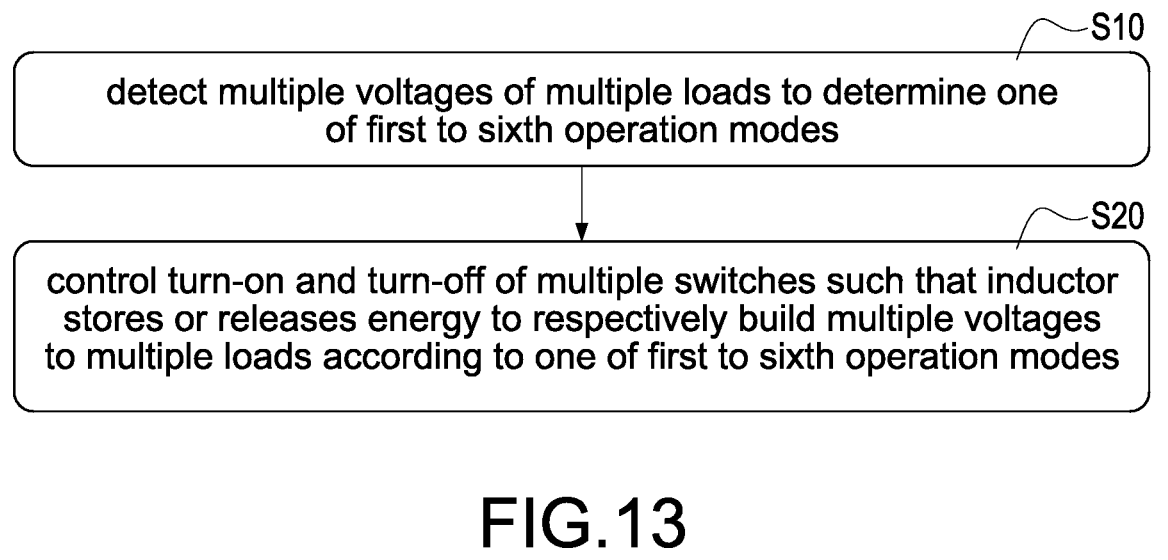

S10 detect multiple voltages of multiple loads to determine one
of first to sixth operation modes

S20 control turn-on and turn-off of multiple switches such that inductor
stores or releases energy to respectively build multiple voltages
to multiple loads according to one of first to sixth operation modes

FIG.13

POWER CONVERTER AND POWER CONVERSION METHOD CAPABLE OF BALANCING ENERGY AND HYBRID POWER SUPPLY

BACKGROUND

Technical Field

The present disclosure relates to an energy balancing circuit and a method of adjusting capacitor voltages, and more particularly to a power converter with multiple output capacitors and a method of adjusting capacitor voltages.

Description of Related Art

In recent years, non-isolated power converters, such as bidirectional power converters and single-to-multiple power converters, have been widely used in uninterruptible power systems, renewable energy systems, fuel cells, and hybrid vehicles. The power converter can provide a single power supply to multiple loads, or transfer the power from one load to another load so as to achieve the purpose of energy balance and hybrid power supply. In the above occasions, the design goals of the power converter include at least: 1. high conversion efficiency; 2. ability to withstand high current; 3. low input current ripple; 4. small size and low cost. Therefore, how to design the single-to-multiple power converter that is suitable for the above occasions and meets the design goals has become a critical topic in this field.

SUMMARY

An objective of the present disclosure is to provide a power converter. The power converter is coupled between a power source and multiple loads. The power converter includes a first switch module. The first switch module includes an inductor, a first switch, a second switch, a third switch, and a fourth switch. The inductor includes a first end and a second end. The first switch includes a first end connected to a first input end, and a second end connected to the first end of the inductor. The second switch incudes a first end connected to the second end of the inductor, and a second end connected to a second input end. The third switch includes a first end connected to a first output end, and a second end connected to the first end of the second switch and the second end of the inductor. The fourth switch includes a first end connected to the second end of the first switch and the first end of the inductor, and a second end connected to a second output end. The first switch, the second switch, the third switch, and the fourth switch are configured to be turned on or off, such that the inductor stores or releases energy to convert the power source into multiple voltages to the multiple loads.

Another objective of the present disclosure is to provide a power conversion method. The method includes steps of: detecting multiple voltages of multiple loads to determine one of a first operation mode, a second operation mode, a third operation mode, a fourth operation mode, a fifth operation mode, and a sixth operation mode, and controlling the turn-on and turn-off of the first switch, the second switch, the third switch, and the fourth switch, such that the inductor stores or releases energy to respectively build a first voltage, a second voltage, and a third voltage to the multiple loads according to one of the six operation modes.

Accordingly, the power converter and power conversion method proposed in the present disclosure have the following features and advantages: 1. by controlling the voltages of the capacitor units through duty cycle adjustment of the switches can reduce the number of components to achieve the advantages of small size and low cost; 2. through the energy storage and release of the inductor, and the control of multiple switches, the energy transfer between the voltages of the capacitor units can be controlled, and the voltages of the capacitor units can be adjusted to meet the requirements of different loads.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 13 is a flowchart of a power conversion method according to the present disclosure.

DETAILED DESCRIPTION

Figure 1:
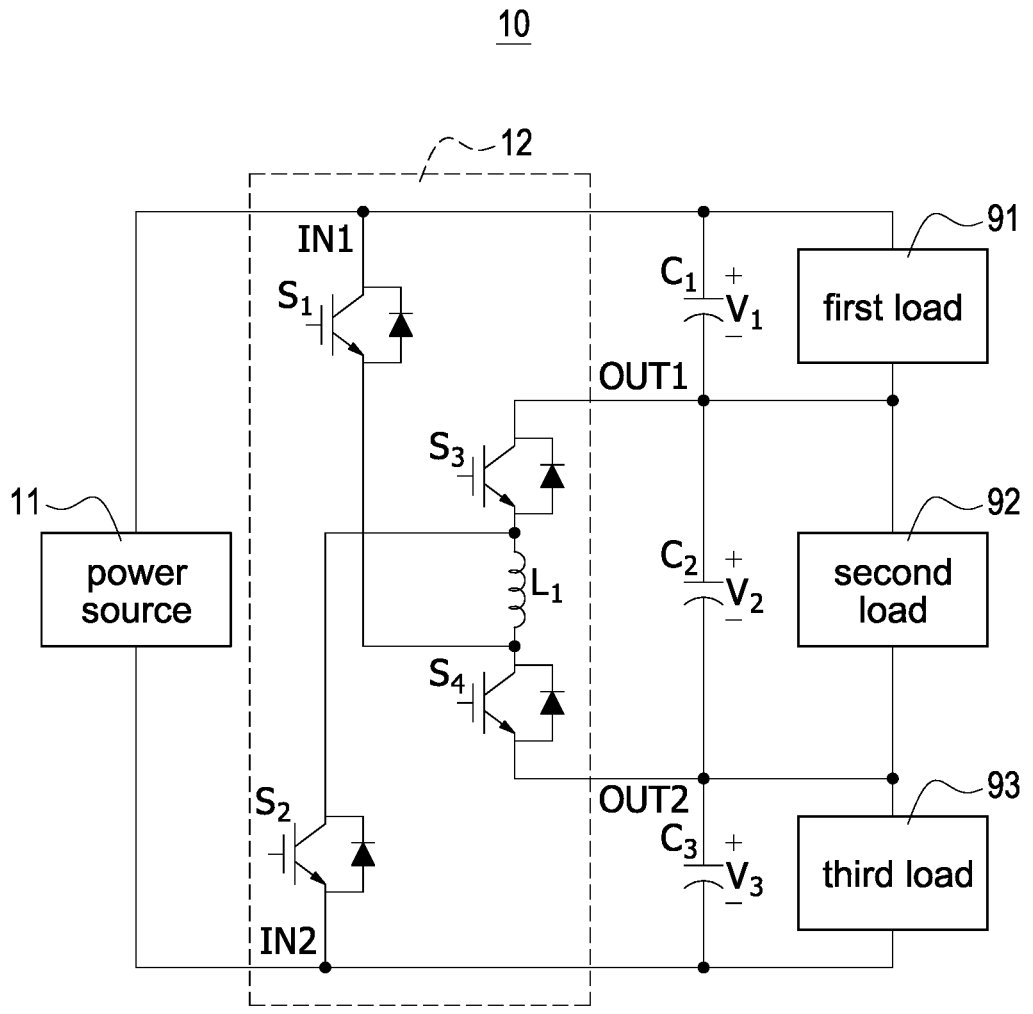
FIG. 1 is a circuit diagram of a power converter according to a first embodiment of the present disclosure.

Reference will now be made to the drawing figures to describe the present disclosure in detail.

Please refer to FIG. 1, which shows a circuit diagram of a power converter according to a first embodiment of the present disclosure. The power converter 10 is coupled between a power source 11 and multiple loads (including a first load 91, a second load 92, and a third load 93). The power converter 10 includes a first switch module 12. As shown in FIG. 1, the first switch module 12 includes an inductor $L_1$, a first switch $S_1$, a second switch $S_2$, a third switch $S_3$, and a fourth switch $S_4$. In addition, the first load 91 is connected between a first input end IN1 and a first output end OUT1, the second load 92 is connected between the first output end OUT1 and a second output end OUT2, and the third load 93 is connected between a second input end IN2 and the second output end OUT2.

The first switch $S_1$ has a first end and a second end, in which the first end of the first switch $S_1$ is connected to the first input end IN1, and the second end of the first switch $S_1$ is connected to a first end of the inductor $L_1$. The second switch $S_2$ has a first end and a second end, in which the first end of the second switch $S_2$ is connected to a second end of the inductor $L_1$, and the second end of the second switch $S_2$ is connected to the second input end IN2. The third switch $S_3$ has a first end and a second end, in which the first end of the third switch $S_3$ is connected to the first output end OUT1, and the second end of the third switch $S_3$ is connected to the first end of the second switch $S_2$ and the second end of the inductor $L_1$. The fourth switch $S_4$ has a first end and a second end, in which the first end of the fourth switch $S_4$ is connected to the second end of the first switch $S_1$ and the first end of the inductor $L_1$, and the second end of the fourth switch $S_4$ is connected to the second output end OUT2.

In particular, the first switch $S_1$, the second switch $S_2$, the third switch $S_3$, and the fourth switch $S_4$ are configured to be turned on or off, such that the inductor $L_1$ stores or releases energy, so as to convert the power source 11 into multiple voltages to the multiple loads 91, 92, 93.

As shown in FIG. 1, the power converter 10 further includes a first capacitor $C_1$, a second capacitor $C_2$, and a third capacitor $C_3$. The first capacitor $C_1$ is connected between the first input end IN1 and the first output end OUT1, and configured to build a first voltage $V_1$. The second capacitor $C_2$ is connected between the first output end OUT1 and the second output end OUT2, and configured to build a second voltage $V_2$. The third capacitor $C_3$ is connected between the second input end IN2 and the second output end OUT2, and configured to build a third voltage $V_3$.

In one embodiment, the power source 11 is a DC (direct-current) power source, and connected between the first input end IN1 and the second input end IN2. The first switch $S_1$, the second switch $S_2$, the third switch $S_3$, and the fourth switch $S_4$ are N-type synchronous rectification switches.

In one embodiment, the power converter 10 is controlled by a controller (not shown), such as a digital signal processor, a programmable logic controller, a microcontroller, and the like. The controller is configured to detect voltage change rates of the multiple loads (or capacitors) so as to determine that the power converter 10 executes one of the first to sixth operation modes. Specifically, when energy drop rate of one of the loads is significantly lower than that of the other loads, the energy stored in the load with the lowest energy drop rate needs to be transferred to the load with the highest energy drop rate. In other words, energy balance and hybrid power supply can be achieved by transferring the energy stored in the load with the least power consumption to the load with the most power consumption. In other embodiments, the controller receives a user instruction to control the power converter 10 to execute which operation mode so as to realize energy scheduling.

Figure 2:
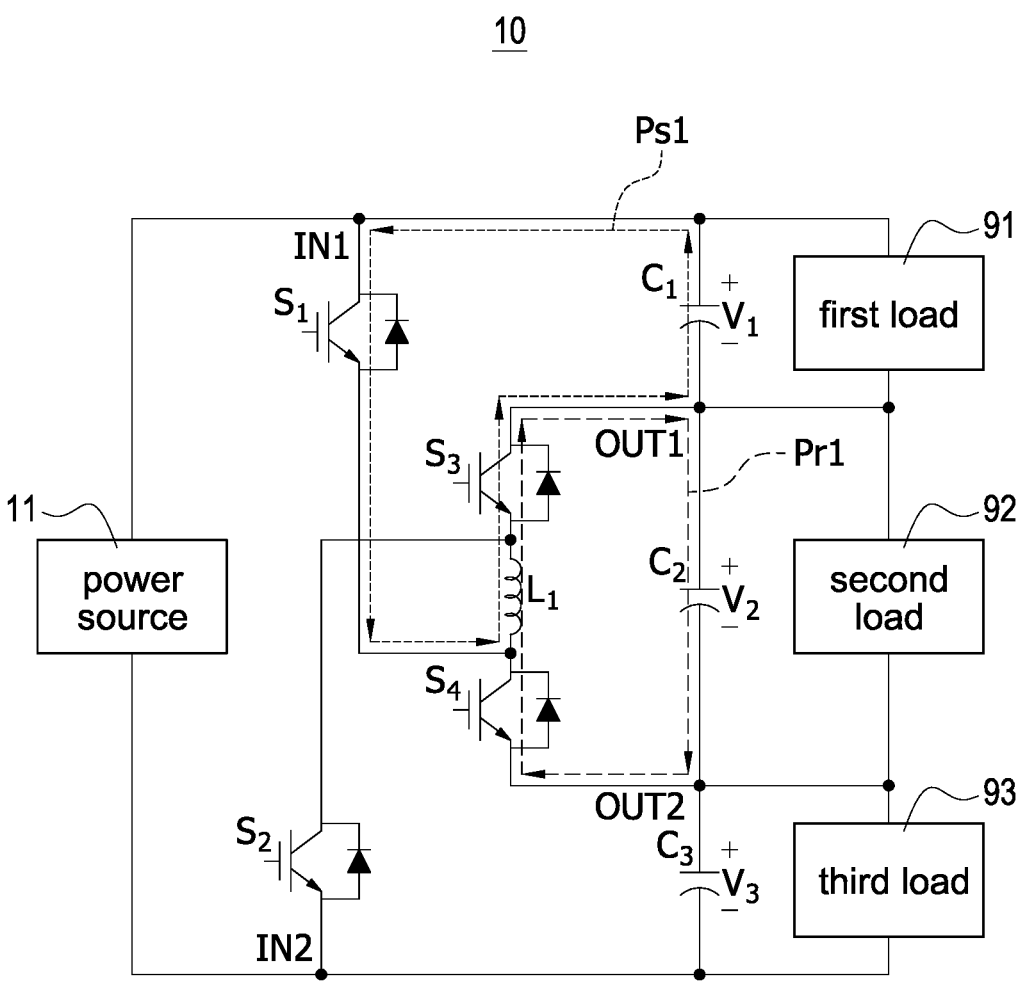
FIG. 2 is a schematic diagram of the power converter in a first operation mode according to the present disclosure.

Please refer to FIG. 2, which shows a schematic diagram of the power converter in a first operation mode according to the present disclosure. As shown in FIG. 2, based on the first switch $S_1$ being turned on, the inductor $L_1$ stores energy stored in the first capacitor $C_1$ (as shown by a first energy-storing path Ps1), and a voltage across the inductor $L_1$ is the first voltage $V_1$. Based on the first switch $S_1$ being turned off, the energy stored in the inductor $L_1$ releases to the second capacitor $C_2$ (as shown by a first energy-releasing path Pr1) to build the second voltage $V_2$ on the second capacitor $C_2$. In the first operation mode of the power converter, energy can be transferred from the first capacitor $C_1$ to the second capacitor $C_2$, and the voltage of the second capacitor $C_2$ can be stabilized. In one embodiment, the condition for the power converter 10 to execute the first operation mode includes at least one of $E_1 > E_3 > E_2$ and $E_1 \gg E_2$, wherein $E_1$, $E_2$, and $E_3$ are respectively the energy stored in the first load 91, the second load 92, and the third load 93. In the first operation mode, since the first energy-storing path Ps1 and the first energy-releasing path Pr1 pass through a body diode of the third switch $S_3$, the third switch $S_3$ may be replaced by a synchronous rectification switch or a diode.

Figure 3:
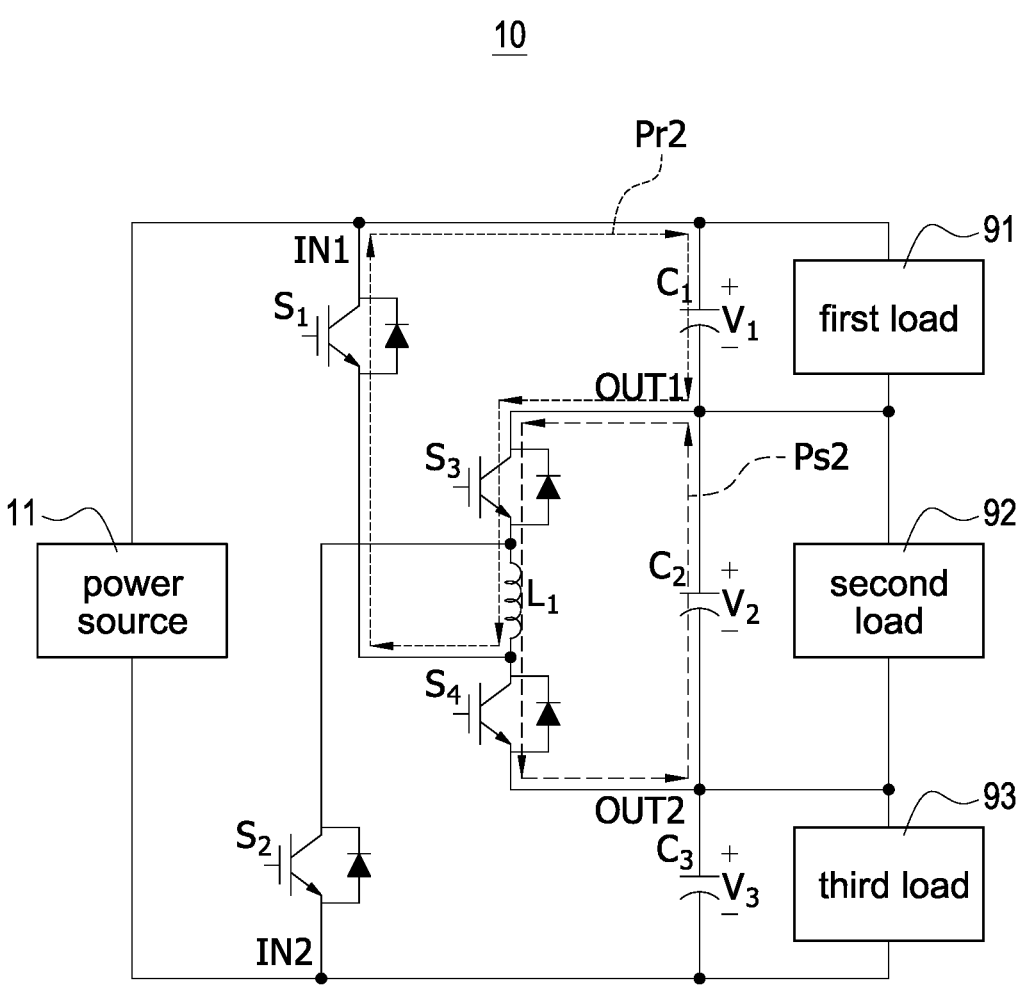
FIG. 3 is a schematic diagram of the power converter in a second operation mode according to the present disclosure.

Please refer to FIG. 3, which shows a schematic diagram of the power converter in a second operation mode according to the present disclosure. As shown in FIG. 3, based on the third switch $S_3$ being turned on and the fourth switch $S_4$ being turned on, the inductor $L_1$ stores energy stored in the second capacitor $C_2$ (as shown by a second energy-storing path Ps2) to build the second voltage $V_2$ on the inductor $L_1$. Based on the fourth switch $S_4$ being turned off and the third switch $S_3$ being still turned on, the energy stored in the inductor $L_1$ releases to the first capacitor $C_1$ (as shown by a second energy-releasing path Pr2) to build the first voltage $V_1$ on the first capacitor $C_1$. In the second operation mode of the power converter, energy can be transferred from the second capacitor $C_2$ to the first capacitor $C_1$, and the voltage of the first capacitor $C_1$ can be stabilized. In one embodiment, the condition for the power converter 10 to execute the second operation mode includes at least one of $E_2 > E_3 > E_1$ and $E_2 \gg E_1$. In the second operation mode, since the second energy-releasing path Pr2 passes through a body diode of the first switch $S_1$, the first switch $S_1$ may be replaced by a synchronous rectification switch or a diode.

Figure 4:
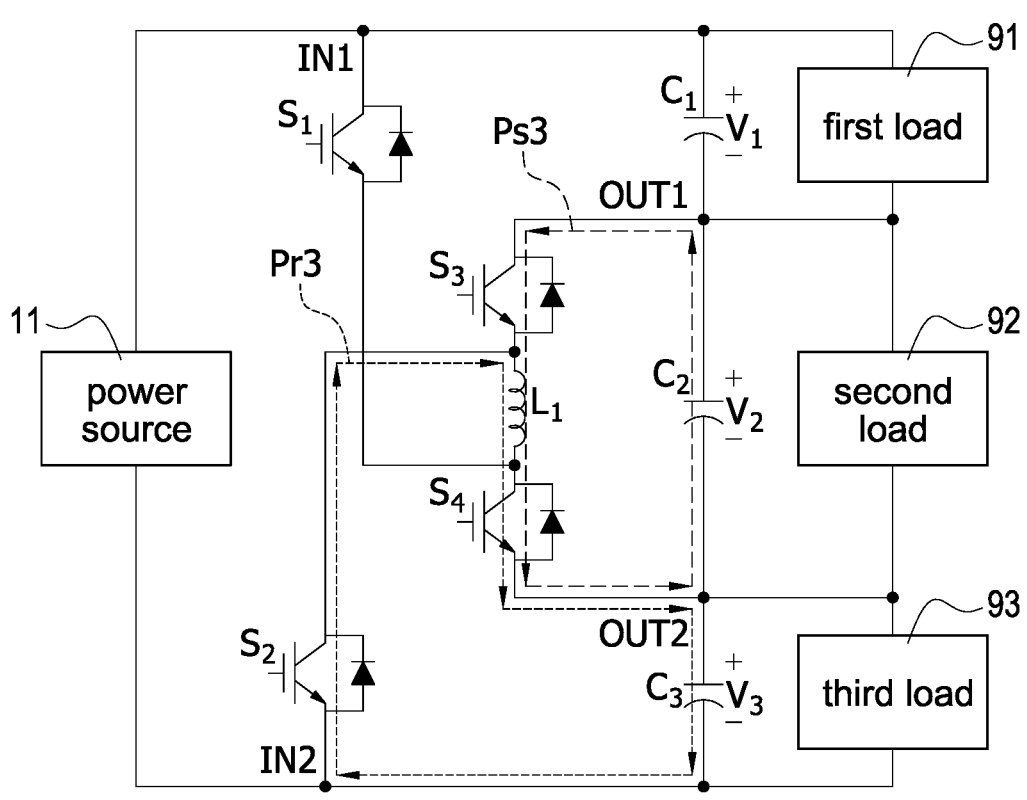
FIG. 4 is a schematic diagram of the power converter in a third operation mode according to the present disclosure.

Please refer to FIG. 4, which shows a schematic diagram of the power converter in a third operation mode according to the present disclosure. As shown in FIG. 4, based on the third switch $S_3$ being turned on and the fourth switch $S_4$ being turned on, the inductor $L_1$ stores energy stored in the second capacitor $C_2$ (as shown by a third energy-storing path Ps3) to build the second voltage $V_2$ on the inductor $L_1$. Based on the third switch $S_3$ being turned off and the fourth switch $S_4$ being still turned on, the energy stored in the inductor $L_1$ releases to the third capacitor $C_3$ (as shown by a third energy-releasing path Pr3) to build the third voltage $V_3$ on the third capacitor $C_3$. In the third operation mode of the power converter, energy can be transferred from the second capacitor $C_2$ to the third capacitor $C_3$, and the voltage of the third capacitor $C_3$ can be stabilized. In one embodiment, the condition for the power converter 10 to execute the third operation mode includes at least one of $E_2 > E_1 > E_3$ and $E_2 \gg E_3$. In the third operation mode, since the third energy-releasing path Pr3 passes through a body diode of the second switch $S_2$, the second switch $S_2$ may be replaced by a synchronous rectification switch or a diode.

Figure 5:
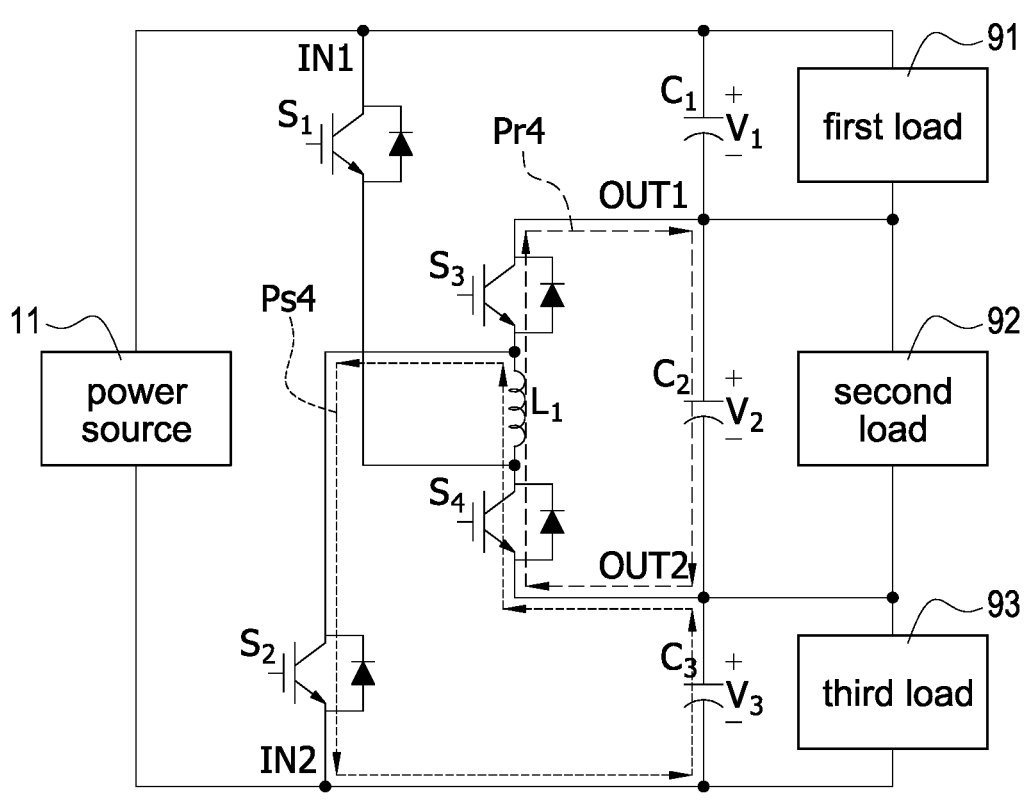
FIG. 5 is a schematic diagram of the power converter in a fourth operation mode according to the present disclosure.

Please refer to FIG. 5, which shows a schematic diagram of the power converter in a fourth operation mode according to the present disclosure. As shown in FIG. 5, based on the second switch $S_2$ being turned on, the inductor $L_1$ stores energy stored in the third capacitor $C_3$ (as shown by a fourth energy-storing path Ps4) to build the third voltage $V_3$ on the inductor $L_1$. Based on the second switch $S_2$ being turned off, the energy stored in the inductor $L_1$ releases to the second capacitor $C_2$ (as shown by a fourth energy-releasing path Pr4) to build the second voltage $V_2$ on the second capacitor $C_2$. In the fourth operation mode of the power converter, energy can be transferred from the third capacitor $C_3$ to the second capacitor $C_2$, and the voltage of the second capacitor $C_2$ can be stabilized. In one embodiment, the condition for the power converter 10 to execute the fourth operation mode includes at least one of $E_3 > E_1 > E_2$ and $E_3 \gg E_2$. In the fourth operation mode, since the fourth energy-storing path Ps4 and the fourth energy-releasing path Pr4 pass through a body diode of the fourth switch $S_4$, the fourth switch $S_4$ may be replaced by a synchronous rectification switch or a diode.

Figure 6:
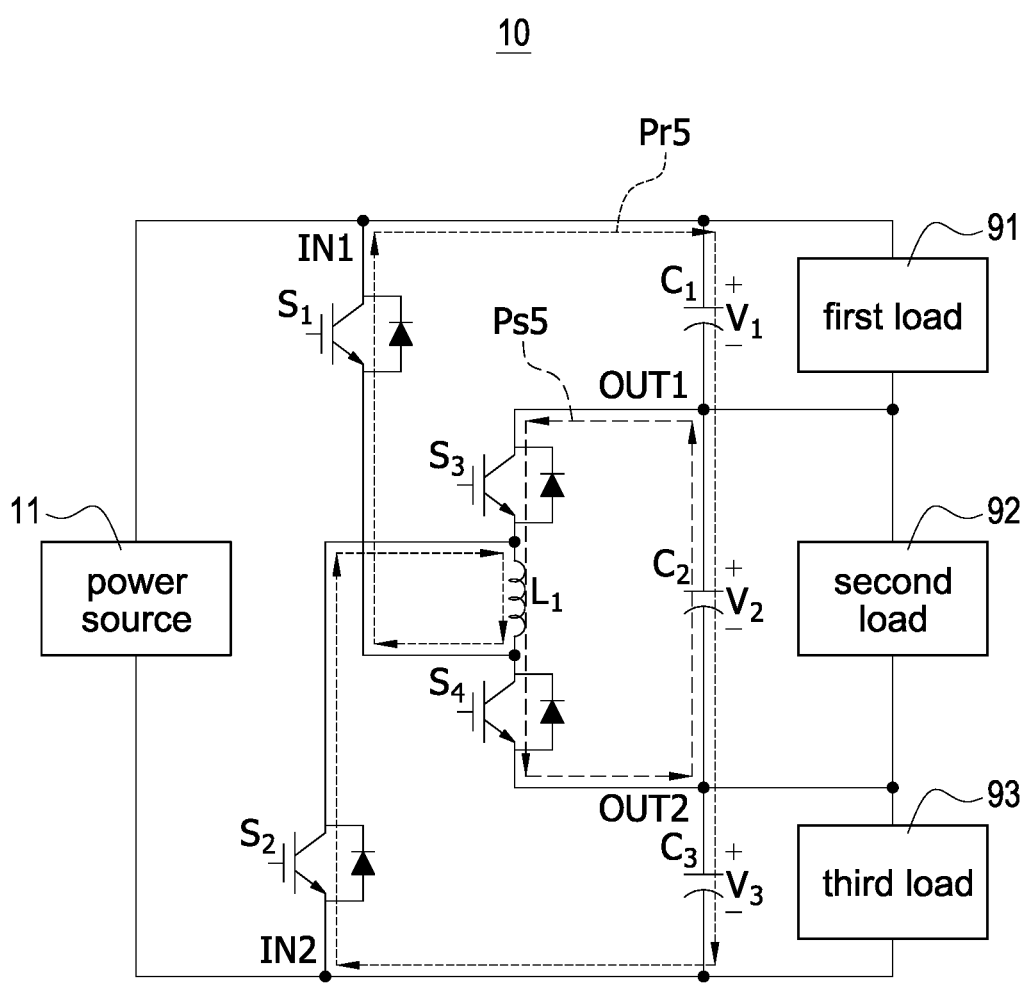
FIG. 6 is a schematic diagram of the power converter in a fifth operation mode according to the present disclosure.

Please refer to FIG. 6, which shows a schematic diagram of the power converter in a fifth operation mode according to the present disclosure. As shown in FIG. 6, based on the third switch $S_3$ being turned on and the fourth switch $S_4$ being turned on, the inductor $L_1$ stores energy stored in the second capacitor $C_2$ (as shown by a fifth energy-storing path Ps5) to build the second voltage $V_2$ on the inductor $L_1$. Based on the third switch $S_3$ being turned off and the fourth switch $S_4$ being turned off, the energy stored in the inductor $L_1$ releases to the first capacitor $C_1$, the second capacitor $C_2$, and the third capacitor $C_3$ (as shown by a fifth energy-releasing path Pr5), to build the first voltage $V_1$ on the first capacitor $C_1$, the second voltage $V_2$ on the second capacitor $C_2$, and the third voltage $V_3$ on the third capacitor $C_3$, and thus a voltage of $V_1+V_2+V_3$ is built on a series path formed by the three capacitors. In the fifth operation mode of the power converter, energy can be transferred from the second capacitor $C_2$ to the first capacitor $C_1$ and the third capacitor $C_3$, and the voltages of the first capacitor $C_1$ and the third capacitor $C_3$ can be stabilized. In one embodiment, the condition for the power converter 10 to execute the fifth operation mode includes at least one of $E_2>E_1=E_3$ and $E_2>>E_1=E_3$. In the fifth operation mode, since the fifth energy-releasing path Pr5 passes through a body diode of the first switch $S_1$ and a body diode of the second switch $S_2$, the first switch $S_1$ and the second switch $S_2$ may be replaced by a synchronous rectification switch or a diode.

Figure 7:
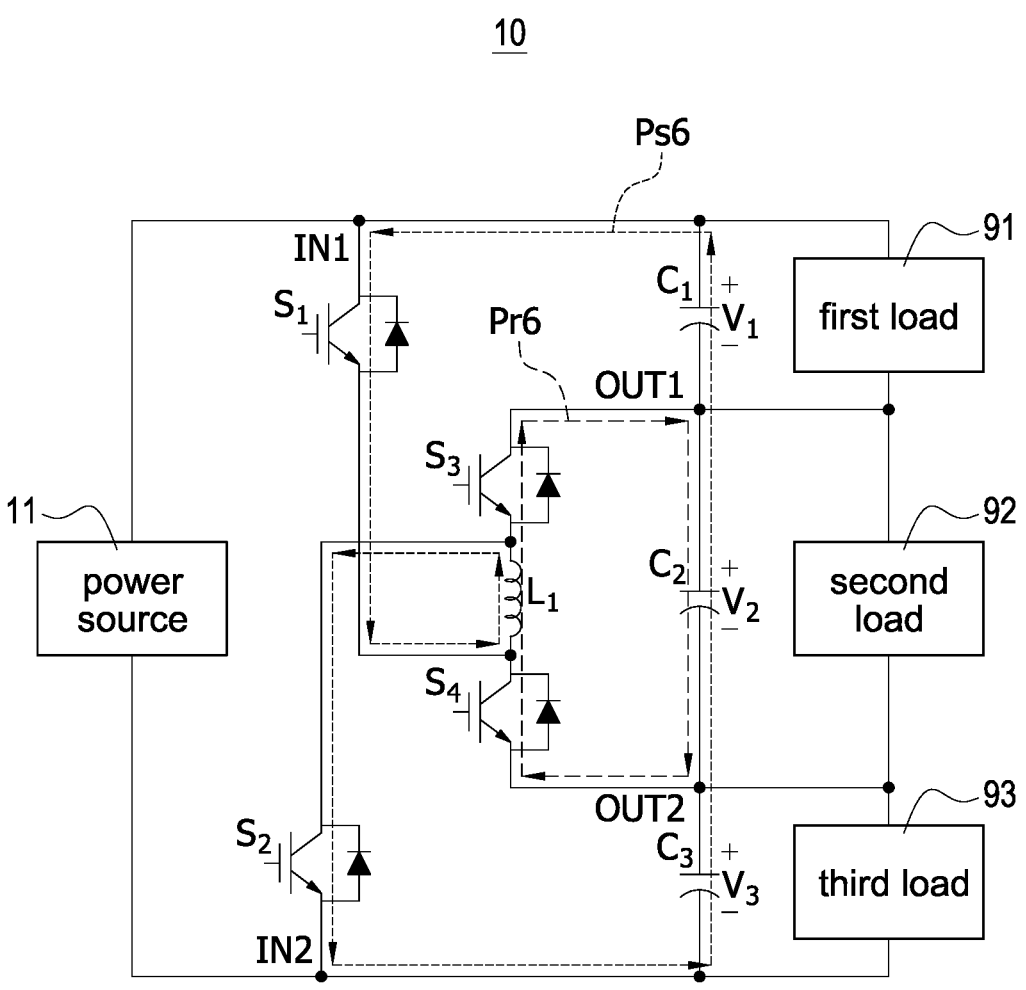
FIG. 7 is a schematic diagram of the power converter in a sixth operation mode according to the present disclosure.

Please refer to FIG. 7, which shows a schematic diagram of the power converter in a sixth operation mode according to the present disclosure. As shown in FIG. 7, based on the first switch $S_1$ being turned on and the second switch $S_2$ being turned on, the inductor $L_1$ stores energy stored in the first capacitor $C_1$, the second capacitor $C_2$, and the third capacitor $C_3$ (as shown by a sixth energy-storing path Ps6) to build a voltage of $V_1+V_2+V_3$ on the inductor $L_1$ is a voltage of $V_1+V_2+V$. Based on the first switch $S_1$ being turned off or the second switch $S_2$ being turned off, the energy stored in the inductor $L_1$ releases to the second capacitor $C_2$ (as shown by a sixth energy-releasing path Pr6) to build the second voltage $V_2$ on the second capacitor $C_2$. In the sixth operation mode of the power converter, energy can be transferred from the first capacitor $C_1$, the second capacitor $C_2$, and the third capacitor $C_3$ to the second capacitor $C_2$, and the voltage of the second capacitor $C_2$ can be stabilized. In one embodiment, the condition for the power converter 10 to execute the sixth operation mode includes at least one of $E_2<E_1=E_3$ and $E_2<<E_1=E_3$. In the sixth operation mode, since the sixth energy-releasing path Pr6 passes through a body diode of the third switch $S_3$ and a body diode of the fourth switch $S_4$, the third switch $S_3$ and the fourth switch $S_4$ may be replaced by a synchronous rectification switch or a diode.

Figure 8:
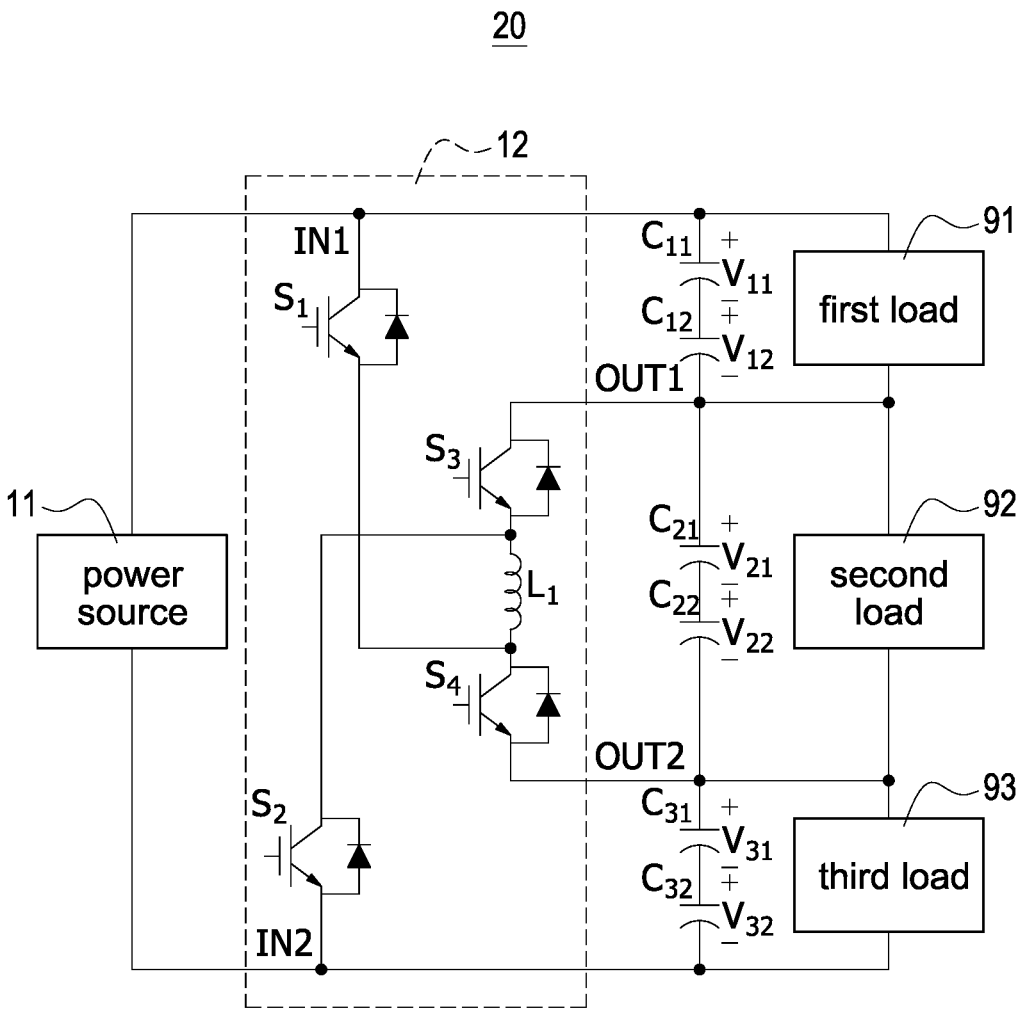
FIG. 8 is a circuit diagram of the power converter according to a second embodiment of the present disclosure.

Please refer to FIG. 8, which shows a circuit diagram of the power converter 20 according to a second embodiment of the present disclosure. A major difference between the second embodiment and the first embodiment shown in FIG. 1 is that the former provides a multi-capacitor cascade structure. In this embodiment, the multi-capacitor cascade structure includes a first capacitor string, a second capacitor string, and a third capacitor string. The first capacitor string includes multiple first capacitors $C_{11}$, $C_{12}$, connected between the first input end IN1 and the first output end OUT1, and configured to build a first voltage $V_1$ including multiple voltages $V_{11}$, $V_{12}$. The second capacitor string includes multiple second capacitors $C_{21}$, $C_{22}$, connected between the first output end OUT1 and the second output end OUT2, and configured to build a second voltage $V_2$ including multiple voltages $V_{21}$, $V_{22}$. The third capacitor string includes multiple third capacitors $C_{31}$, $C_{32}$, connected between the second input end IN2 and the second output end OUT2, and configured to build a third voltage $V_3$ including multiple voltages $V_{31}$, $V_{32}$. In this embodiment, the power source 11 is a DC power source connected between the first input end IN1 and the second input end IN2. The first switch $S_1$, the second switch $S_2$, the third switch $S_3$, and the fourth switch $S_4$ are N-type synchronous rectification switches.

Figure 9:
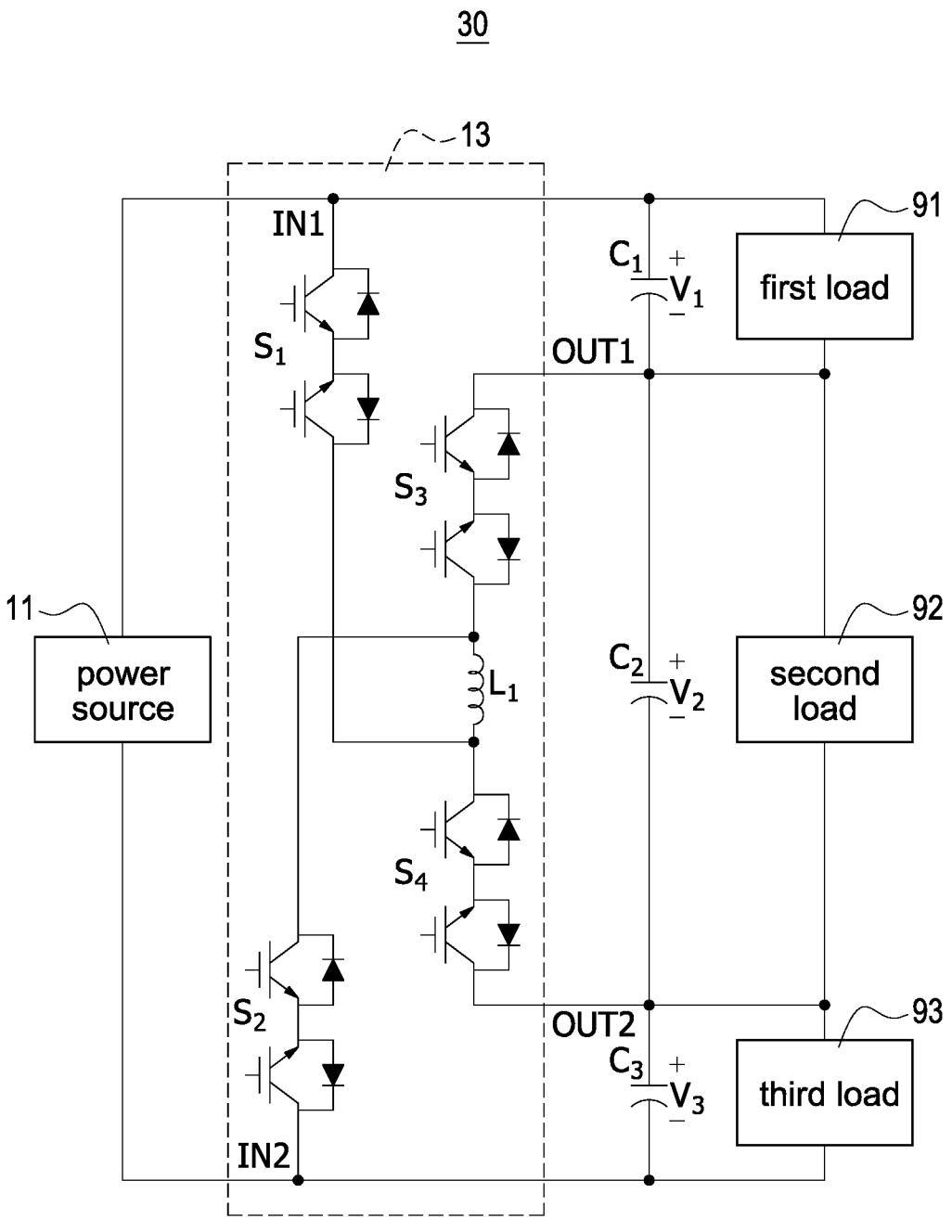
FIG. 9 is a circuit diagram of the power converter according to a third embodiment of the present disclosure.

Please refer to FIG. 9, which shows a circuit diagram of the power converter 30 according to a third embodiment of the present disclosure. In this embodiment, the power source 11 is an AC (alternating-current) power source, and the first switch $S_1$, the second switch $S_2$, the third switch $S_3$, and the fourth switch $S_4$ are back-to-back bidirectional switches. Therefore, adapting to different positive and negative half cycles of the AC power source, the purpose of capacitor voltage adjustment can be achieved through the back-to-back bidirectional switch.

Figure 10:
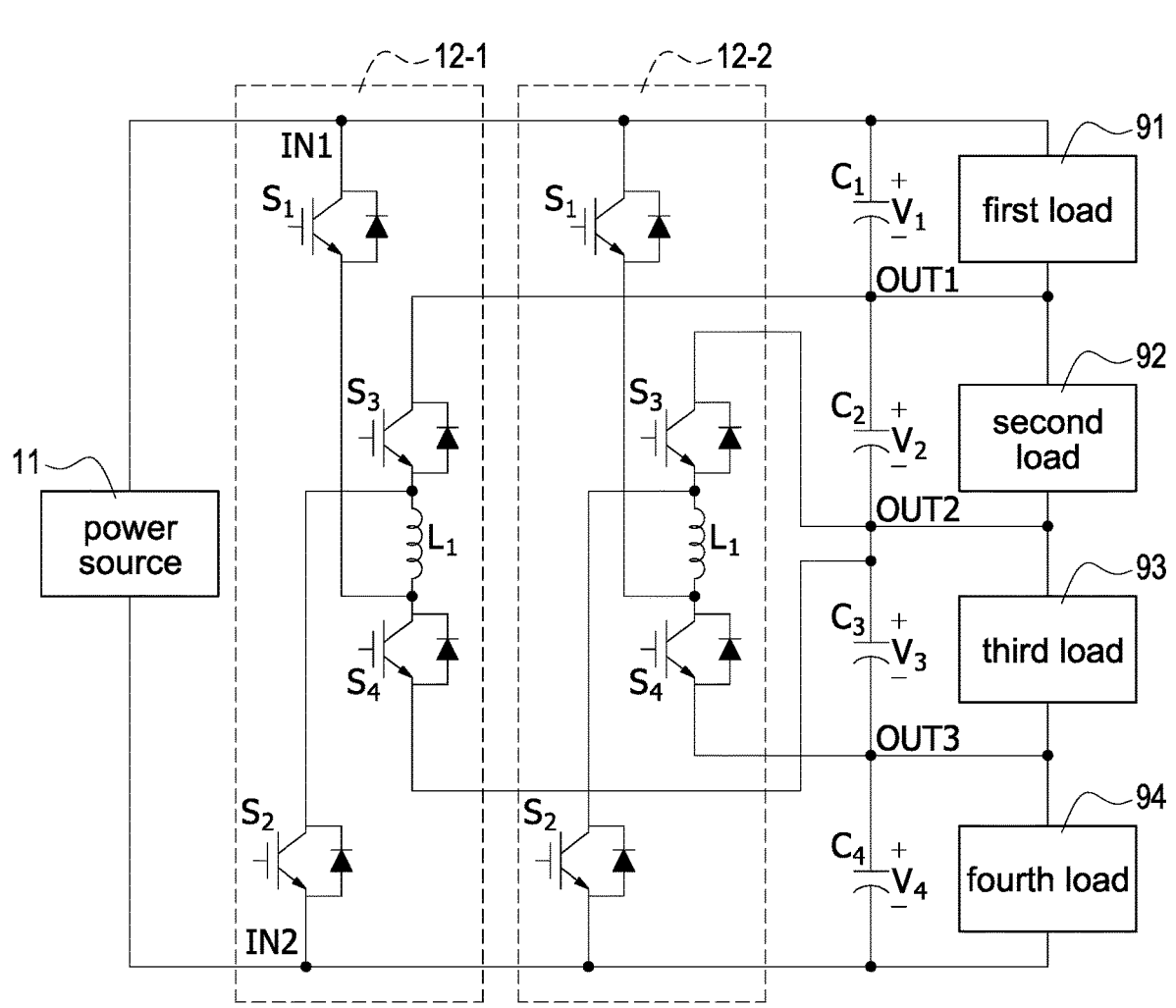
FIG. 10 is a circuit diagram of the power converter according to a fourth embodiment of the present disclosure.

Please refer to FIG. 10, which shows a circuit diagram of the power converter 40 according to a fourth embodiment of the present disclosure. A major difference between the fourth embodiment and the first embodiment shown in FIG. 1 is that the former provides two switch modules, that is, a first switch module 12-1 and a second switch module 12-2, and four capacitors $C_1$, $C_2$, $C_3$, $C_4$, that is, a fourth capacitor $C_4$ is extra compared with the above-mentioned embodiments. In this embodiment, the first switch module 12-1 is corresponding to the first switch module 12 in the first embodiment. A first end of the third switch $S_3$ of the second switch module 12-2 is connected to the second output end OUT2, and a second end of the fourth switch $S_4$ of the second switch module 12-2 is connected to the third output end OUT3. The fourth capacitor $C_4$ is connected between the third output end OUT3 and the second input end IN2, and configured to build a fourth voltage $V_4$. The fourth load 94 is connected between the third output end OUT3 and the second input end IN2.

Figure 11:
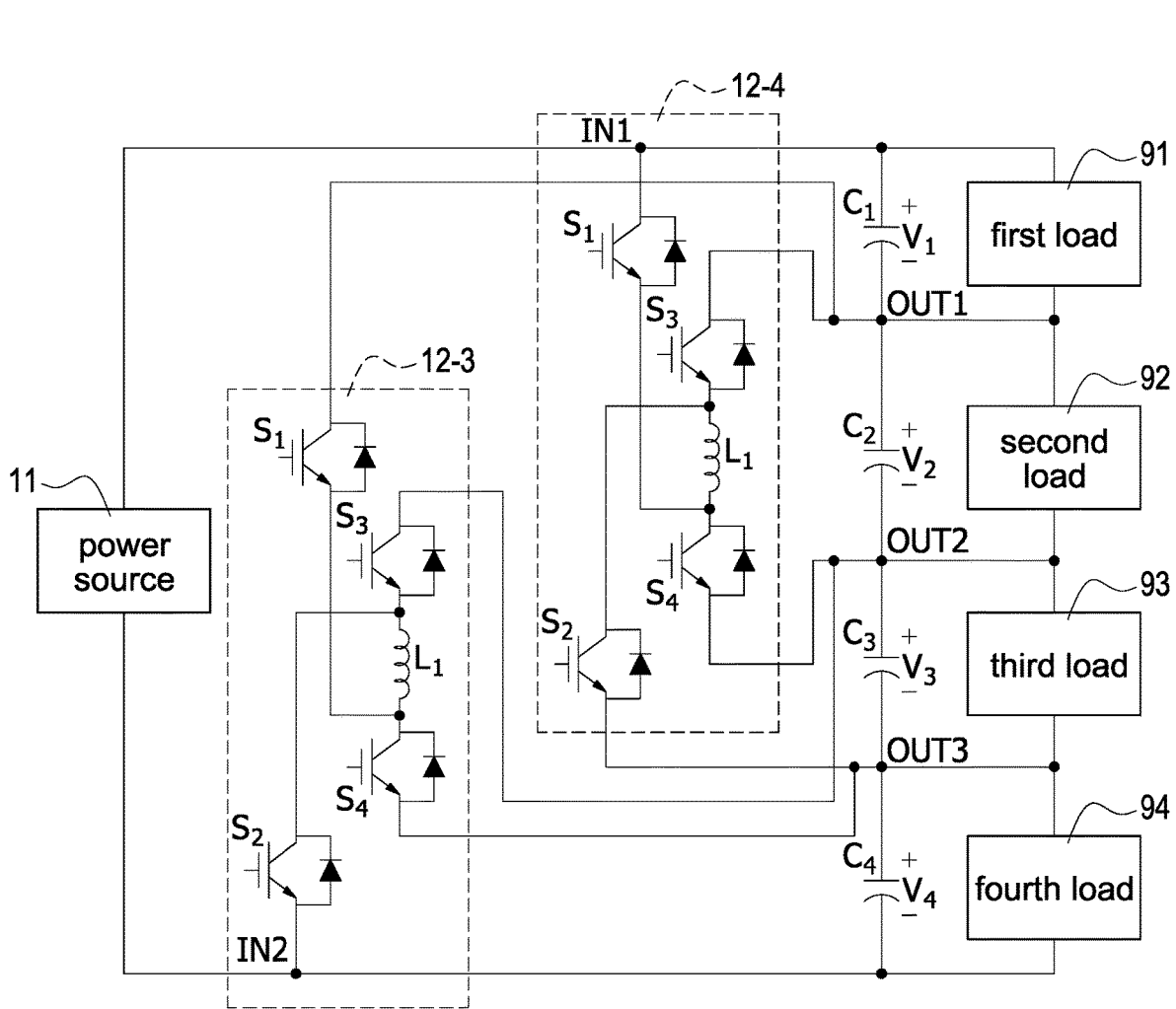
FIG. 11 is a circuit diagram of the power converter according to a fifth embodiment of the present disclosure.

Please refer to FIG. 11, which shows a circuit diagram of the power converter 50 according to a fifth embodiment of the present disclosure. The power converter 50 is coupled between the power source 11 and multiple loads (including a first load 91, a second load 92, a third load 93, and a fourth load 94). The power converter 10 includes a first switch module 12-3. As shown in FIG. 11, the first switch module 12-3 includes an inductor $L_1$, a first switch $S_1$, a second switch $S_2$, a third switch $S_3$, and a fourth switch $S_4$. The first switch $S_1$ includes a first end connected to the first output end OUT1, and a second end connected to a first end of the inductor $L_1$. The second switch $S_2$ includes a first end connected to a second end of the inductor $L_1$, and a second end connected to the second input end IN2. Third switch $S_3$ includes a first end connected to the second output end OUT2, and a second end connected to the first end of the second switch $S_2$ and a second end of the inductor $L_1$. The fourth switch $S_4$ includes a first end connected to the second end of the first switch $S_1$ and the first end of the inductor $L_1$, and a second end connected to the third output end OUT3.

As shown in FIG. 11, the power converter 50 further includes a first capacitor $C_1$, a second capacitor $C_2$, and a third capacitor $C_3$. The first capacitor $C_1$ is connected between the first input end IN1 and the first output end OUT1, and configured to build a first voltage $V_1$. The second capacitor $C_2$ is connected between the first output end OUT1 and the second output end OUT2, and configured to build a second voltage $V_2$. The third capacitor $C_3$ is connected between the second input end IN2 and the second output end OUT2, and configured to build a third voltage $V_3$. In this embodiment, the power source 11 is a DC power source, and connected between the first input end IN1 and the second input end IN2. The first switch $S_1$, the second switch $S_2$, the third switch $S_3$, and the fourth switch $S_4$ are N-type synchronous rectification switches.

As shown in FIG. 11, the power converter 50 further includes a second switch module 12-4 and a fourth capacitor $C_4$. The second switch module 12-4 includes a first switch $S_1$, a second switch $S_2$, a third switch $S_3$, and a fourth switch $S_4$. A first end of the first switch $S_1$ is connected to the first input end IN1, a second end of the second switch $S_2$ is connected to the third output end OUT3, a first end of the third switch $S_3$ is connected to the first output end OUT1, and a second end of the fourth switch $S_4$ is connected to the second output end OUT2. The fourth capacitor $C_4$ is connected between the third output end OUT3 and the second input end IN2.

In addition, the first load 91 is connected between the first input end IN1 and the first output end OUT1, the second load 92 is connected between the first output end OUT1 and the second output end OUT2, the third load 93 is connected between the second output end OUT2 and the third output end OUT3, and the fourth load 94 is connected between the third output end OUT3 and the second input end IN2.

In another embodiment, the power source 11 is an AC power source, and the first switch $S_1$, the second switch $S_2$, the third switch $S_3$, and the fourth switch $S_4$ are back-to-back bidirectional switches. Therefore, adapting to different positive and negative half cycles of the AC power source, the purpose of capacitor voltage adjustment can be achieved through the back-to-back bidirectional switch.

Figure 12:
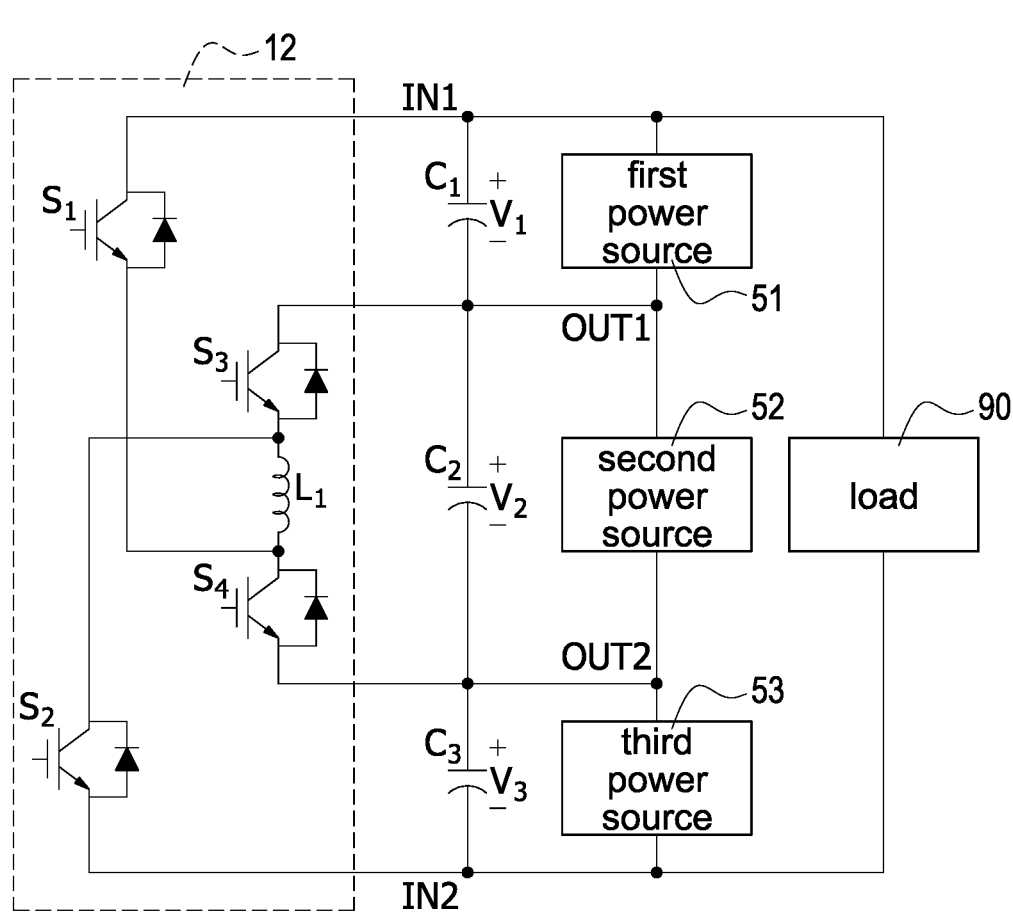
FIG. 12 is a circuit diagram of the power converter according to a sixth embodiment of the present disclosure.

Please refer to FIG. 12, which shows a circuit diagram of the power converter 60 according to a sixth embodiment of the present disclosure. In the embodiment, when multiple loads supply power to the power source 11. One of the multiple loads is a first power source 51, and the first power source 51 is connected between the first input end IN1 and the first output end OUT1. One of the multiple loads is a second power source 52, and the second power source 52 is connected between the first output end OUT1 and the second output end OUT2. One of the multiple loads is a third power source 53, and the third power source 53 is connected between the second input end IN2 and the second output end OUT2. In this embodiment, the power source 11 serves as a load 90 connected between the first input end IN1 and the second input end IN2. In this embodiment, the first power source 51 and the first capacitor $C_1$ may be a battery, such as but not limited to a supercapacitor, a lithium battery, or a lead-acid battery. Similarly, the second power source 52 and the second capacitor $C_2$, and the third power source 53 and the third capacitor $C_3$ are both batteries. Therefore, the stable input voltage is provided by the battery, and the switches $S_1$, $S_2$, $S_3$, $S_4$ of the first switch module 12 are controlled as described above so as to achieve a bidirectional power flow, stabilize the battery voltage for charging and discharging, and provide the demand for the power source 11 (i.e., the load 90).

Please refer to FIG. 13, which shows a flowchart of a power conversion method according to the present disclosure. The description will be made in conjunction with one of the embodiments of different power converters disclosed above. The power converter includes a first switch $S_1$, a second switch $S_2$, a third switch $S_3$, a fourth switch $S_4$, an inductor $L_1$, a first capacitor $C_1$, a second capacitor $C_2$, and a third capacitor $C_3$. The power conversion method includes steps as follows. First, detect multiple voltages of multiple loads to determine one of first to sixth operation modes (step S10). Afterward, control the turn-on and turn-off of the first switch $S_1$, the second switch $S_2$, the third switch $S_3$, and the fourth switch $S_4$ to make the inductor $L_1$ store or release energy to respectively build a first voltage $V_1$, a second voltage $V_2$, and a third voltage $V_3$ to multiple loads according to one of first to sixth operation modes (step S20).

In the first operation mode, the method includes a step of: turning on the first switch $S_1$ so that the inductor $L_1$ stores energy stored in the first capacitor $C_1$ to build a first voltage $V_1$ on the inductor $L_1$, and turning off the first switch $S_1$ so that the first voltage $V_1$ of the inductor $L_1$ releases energy to the second capacitor $C_2$ to build a second voltage $V_2$ on the second capacitor $C_2$.

In the second operation mode, the method includes a step of: turning on the third switch $S_3$ and the fourth switch $S_4$ so that the inductor $L_1$ stores energy stored in the second capacitor $C_2$ to build a second voltage $V_2$ on the inductor $L_1$, and turning off the fourth switch $S_4$ and turning on the third switch $S_3$ so that the second voltage $V_2$ of the inductor $L_1$ releases energy to the first capacitor $C_1$ to build a first voltage $V_1$ on the first capacitor $C_1$.

In the third operation mode, the method includes a step of: turning on the third switch $S_3$ and the fourth switch $S_4$ so that the inductor $L_1$ stores energy stored in the second capacitor $C_2$ to build a second voltage $V_2$ on the inductor $L_1$, and turning off the third switch $S_3$ and turning on the fourth switch $S_4$ so that the second voltage $V_2$ of the inductor $L_1$ releases energy to the third capacitor $C_3$ to build a third voltage $V_3$ on the third capacitor $C_3$.

In the fourth operation mode, the method includes a step of: turning on the second switch $S_2$ so that the inductor $L_1$ stores energy stored in the third capacitor $C_3$ to build a third voltage $V_3$ on the inductor $L_1$, and turning off the second switch $S_2$ so that the third voltage $V_3$ of the inductor $L_1$ releases energy to the second capacitor $C_2$ to build a second voltage $V_2$ on the second capacitor $C_2$.

In the fifth operation mode, the method includes a step of: turning on the third switch $S_3$ and the fourth switch $S_4$ so that the inductor $L_1$ stores energy stored in the second capacitor $C_2$ to build a second voltage $V_2$ on the inductor $L_1$, and turning off the third switch $S_3$ and the fourth switch $S_4$ so that the energy stored in the inductor $L_1$ releases to the first capacitor $C_1$, the second capacitor $C_2$, and the third capacitor $C_3$ to build a first voltage $V_1$ on the first capacitor $C_1$, a second voltage $V_2$ on the second capacitor $C_2$, and a third voltage $V_3$ on the third capacitor $C_3$.

In the sixth operation mode, the method includes a step of: turning on the first switch $S_1$ and the second switch $S_2$ so that the inductor $L_1$ stores energy stored in the first capacitor $C_1$, the energy stored in the second capacitor $C_2$, and the energy stored in the third capacitor $C_3$ to build a total voltage of $V_1+V_2+V_3$ (that is, the sum of the first voltage $V_1$, the second voltage $V_2$, and the third voltage $V_3$) on the inductor $L_1$, and turning off the first switch $S_1$ or the second switch $S_2$ so that the total voltage of $V_1+V_2+V_3$ of the inductor $L_1$ releases energy to the second capacitor $C_2$ to build a second voltage $V_2$ on the second capacitor $C_2$.

In conclusion, the present disclosure has following features and advantages:

1. The power converter proposed in the present disclosure controls the voltages of the capacitor units through duty cycle adjustment of the switches to reduce the number of components and achieve the advantages of small size and low cost.

2. Through the energy storage and release of the inductor, and the control of multiple switches, the energy transfer between the voltages of the capacitor units can be controlled, and the voltages of the capacitor units can be adjusted to meet the requirements of different loads.

The present disclosure has been described with reference to the preferred embodiment thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter, coupled between a power source and multiple loads, the power converter comprising:
   a first switch module comprising:
      an inductor comprising a first end and a second end;
      a first switch comprising a first end connected to a first input end, and a second end connected to the first end of the inductor;
      a second switch comprising a first end connected to the second end of the inductor, and a second end connected to a second input end;
      a third switch comprising a first end connected to a first output end, and a second end connected to the first end of the second switch and the second end of the inductor; and
      a fourth switch comprising a first end connected to the second end of the first switch, and a second end connected to a second output end,
   wherein the first switch, the second switch, the third switch, and the fourth switch are configured to be turned on or off, such that the inductor stores or releases energy to convert the power source into multiple voltages to the multiple loads,
   wherein a first load of the multiple loads is connected between the first input end and the first output end, a second load of the multiple loads is connected between the first output end and the second output end, and a third load of the multiple loads is connected between the second input end and the second output end.

2. The power converter of claim 1, further comprising:
   a first capacitor connected between the first input end and the first output end, and configured to build a first voltage;
   a second capacitor connected between the first output end and the second output end, and configured to build a second voltage; and
   a third capacitor connected between the second input end and the second output end, and configured to build a third voltage;
   wherein the power source is a DC power source connected between the first input end and the second input end; and the first switch, the second switch, the third switch, and the fourth switch are N-type synchronous rectification switches.

3. The power converter of claim 1, further comprising:
   a first capacitor string comprising multiple first capacitors connected in series, connected between the first input end and the first output end, and configured to build a first voltage;
   a second capacitor string comprising multiple second capacitors connected in series, connected between the first output end and the second output end, and configured to build a second voltage; and
   a third capacitor string comprising multiple third capacitors connected in series, connected between the second input end and the second output end, and configured to build a third voltage;
   wherein the power source is a DC power source connected between the first input end and the second input end; and the first switch, the second switch, the third switch, and the fourth switch are N-type synchronous rectification switches.

4. The power converter of claim 1, wherein the power source is an AC power source, and the first switch, the second switch, the third switch, and the fourth switch are back-to-back bidirectional switches.

5. The power converter of claim 1, further comprising:
   a second switch module, wherein a first end of a third switch of the second switch module is connected to the second output end, and a second end of a fourth switch of the second switch module is connected to a third output end; and
   a fourth capacitor connected between the third output end and the second input end, and configured to build a fourth voltage.

6. The power converter of claim 1, wherein, when the multiple loads supply one of the multiple loads serves as a first power source connected between the first input end and the first output end;
   one of the multiple loads serves as a second power source connected between the first output end and the second output end;
   one of the multiple loads serves as a third power source connected between the second input end and the second output end; and
   the power source serves as a load connected between the first input end and the second input end.

7. A power conversion method, used for the power converter of claim 1, the power converter comprising the first switch, the second switch, the third switch, the fourth switch, the inductor, a first capacitor, a second capacitor, and a third capacitor, the power conversion method comprising steps of:
   detecting multiple voltages of multiple loads to determine one of a first operation mode, a second operation mode, a third operation mode, a fourth operation mode, a fifth operation mode, and a sixth operation mode; and
   controlling turn-on and turn-off of the first switch, the second switch, the third switch, and the fourth switch, such that the inductor stores or releases energy to respectively build a first voltage, a second voltage, and a third voltage to the multiple loads according to one of the six operation modes.

8. The power conversion method of claim 7, in the first operation mode, comprising steps of:
   turning on the first switch, so that the inductor stores the energy stored in the first capacitor to build the first voltage on the inductor; and
   turning off the first switch, so that the first voltage of the inductor releases energy to the second capacitor to build the second voltage on the second capacitor.

9. The power conversion method of claim 7, in the second operation mode, comprising steps of:
   turning on the third switch and the fourth switch, so that the inductor stores the energy stored in the second capacitor to build the first voltage on the inductor; and
   turning off the fourth switch and turning on the third switch, so that the second voltage of the inductor releases energy to the first capacitor to build the first voltage on the first capacitor.

10. The power conversion method of claim 7, in the third operation mode, comprising steps of:

turning on the third switch and the fourth switch, so that the inductor stores the energy stored in the second capacitor to build the second voltage on the inductor; and turning off the third switch and turning on the fourth switch, so that the second voltage of the inductor releases energy to the third capacitor to build the third voltage on the third capacitor.

11. The power conversion method of claim 7, in the fourth operation mode, comprising steps of:

turning on the second switch, so that the inductor stores the energy stored in the third capacitor to build the third voltage on the inductor; and turning off the second switch, so that the third voltage of the inductor releases energy to the second capacitor to build the second voltage on the second capacitor.

12. The power conversion method of claim 7, in the fifth operation mode, comprising steps of:

turning on the third switch and the fourth switch, so that the inductor stores the energy stored in the second capacitor to build the second voltage on the inductor; and turning off the third switch and the fourth switch, so that the energy stored in the inductor releases to the first capacitor, the second capacitor, and the third capacitor to build the first voltage on the first capacitor, the second voltage on the second capacitor, and the third voltage on the third capacitor.

13. The power conversion method of claim 7, in the sixth operation mode, comprising steps of:

turning on the first switch and the second switch, so that the inductor stores the energy stored in the first capacitor, the energy stored in the second capacitor, and the energy stored in the third capacitor to build a total voltage on the inductor; and turning off the first switch and the second switch, so that the inductor releases the total voltage to the second capacitor to build the second voltage on the second capacitor.

\*    \*    \*    \*    \*